United States Patent [15] 3,683,491

Nelson et al. [45] Aug. 15, 1972

[54] METHOD FOR FABRICATING PINCHED RESISTOR SEMICONDUCTOR STRUCTURE

[72] Inventors: Carroll E. Nelson, 1009 Vistadale Drive, Dallas, Tex. 75238; Hans R. Camenzind, 862 Springer Road, Los Altos, Calif. 94022; Albert P. Youmans, 11249 Redondo Court, Cupertino, Calif. 95014

[22] Filed: Nov. 12, 1970

[21] Appl. No.: 88,989

Related U.S. Application Data

[62] Division of Ser. No. 791,657, Jan. 16, 1969, Pat. No. 3,556,219.

[52] U.S. Cl. ........................................29/571, 29/580

[51] Int. Cl. ..........................B01j 17/00, H01g 13/00

[58] Field of Search..........29/571, 580, 583, 576 IW; 317/235 A

[56] References Cited

UNITED STATES PATENTS

| | | | |
|---|---|---|---|
| 3,275,911 | 9/1966 | Onodera | 317/235 A |
| 3,344,324 | 9/1967 | Beale | 317/235 A |
| 3,412,296 | 11/1968 | Grebene | 317/235 A |
| 3,449,647 | 6/1969 | Scott et al. | 317/235 A |

*Primary Examiner*—John F. Campbell
*Assistant Examiner*—W. Tupman
*Attorney*—Flehr, Hohback, Test, Albritton & Herbert

[57] ABSTRACT

Method for fabricating a pinched resistor semiconductor structure having a channel and a field plate to provide a depletion region which pinches off the channel so that the current flow remains constant for any voltage after a predetermined voltage is reached.

3 Claims, 12 Drawing Figures

PATENTED AUG 15 1972 3,683,491

METHOD FOR FABRICATING PINCHED RESISTOR SEMICONDUCTOR STRUCTURE

Cross-Reference to Related Application

This is a division of application Ser. No. 791,657, filed Jan. 16, 1969, now U.S. Pat. No. 3,566,219.

BACKGROUND OF THE INVENTION

In copending application Ser. No. 791,660, filed Jan. 16, 1969, now U.S. Pat. No. 3,619,739, there is disclosed a bulk resistor which is satisfactory for low values of resistance but when it is desired to obtain resistances which are greater than 100 kilohms in resistance, they become rather large. Thin film resistors which have been utilized for obtaining high values of resistance are relatively expensive and require additional processing steps, some of which are critical. There is therefore a need for a new and improved resistor which has high values of resistance and which is compatible with the steps utilized in making integrated circuits.

SUMMARY OF THE INVENTION

The pinched resistor structure comprises a support body with a semiconductor island carried by the support body and which has a planar surface. THe island is characterized in that it has a relatively shallow channel at one end which has a depth which is substantially less than the remaining portion of the island. Contact elements are provided which make contact with the island with one of the contact elements being disposed in the channel. Means is provided between the two contact elements for creating a depletion region which goes to the depth of the channel so that it is completely pinched off to thereby cause the current to remain constant independent of voltage. This means includes a region of opposite conductivity formed within the island with a field plate overlying the region of opposite conductivity and extending beyond the same.

In general, it is an object of the present invention to provide a pinched resistor structure which makes is possible to obtain relatively high values of resistance.

Another object of the invention is to provide a pinched resistor structure of the above character which is compatible with present-day integrated circuitry.

Another object of the invention is to provide a structure of the above character which is relatively simple.

Additional objects and features of the invention appear from the following description in which the preferred embodiments are set forth in detail in conjunction with accompanying drawings.

DESCRIPTION OF THE PREFERRED EMBODIMENT

Figure 1:
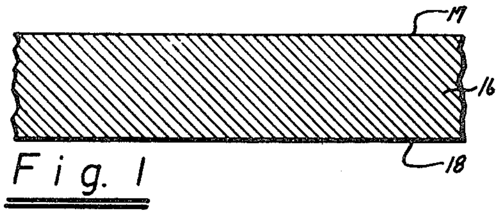
FIG. 1 through 9 are cross-sectional views showing the method utilized in making a pinched resistor in accordance with the present invention.
Figure 2:
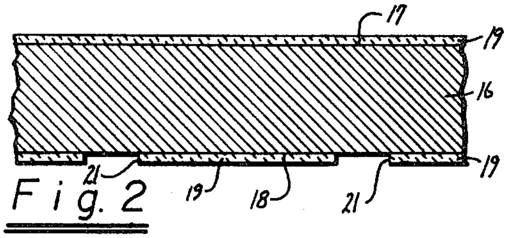

The pinched resistor is formed by taking a wafer of a suitable semiconductor material, such as monocrystalline or single crystalline silicon 16. This silicon wafer 16 can be doped with a suitable impurity such as an N-type impurity if desired. The top and bottom surfaces 17 and 18 are ground flat and parallel. Thereafter, the wafer is placed in an oxidizing atmosphere to form insulating layers 19 on the surfaces 17 and 18. When the semiconductor body 16 is formed of silicon, the insulating layers 19 will be formed of silicon dioxide.

Figure 3:
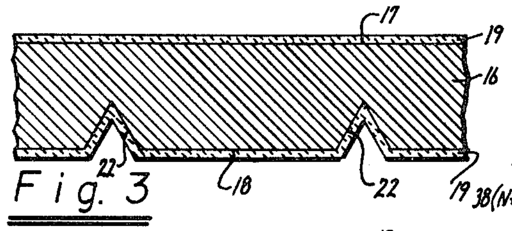
Figure 4:
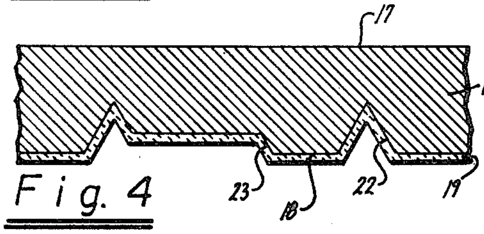

Windows 21 are then opened through the oxide layer 19 on the surface 18 to expose the surface 18. The wafer 16 is then placed in a suitable etch such as an anisotropic etch to form grooves or recesses 22 in the semiconductor body 16. When an anisotropic etch is utilized, the grooves or recesses take a "V"-shaped configuration in cross-section as shown in FIG. 3. After the grooves or recesses 22 have been formed, the oxide 19 is stripped and regrown. Thereafter a large window (not shown) is formed in the oxide 19 from one of the grooves or recesses 22 to a point somewhere between the two adjacent recesses 22. The wafer 16 is again placed in an anisotropic etch and the etching is carried out for a period of time depending upon the depth of the channel desired, as hereinafter explained but which should be less than the depth to which the recesses 22 had been previously etched. After this etching step has been completed to form the large recess 23 which joins one of the "V"-shaped recesses 22 previously formed, the oxide is again stripped and regrown over the entire surface as shown in FIG. 4.

A support body 26 is then provided on the oxide layer 19 adjacent the surface 18 in a suitable manner, for example, polycrystalline silicon can be deposited on the oxide 19 in a manner well known to those skilled in the art to provide a support structure 26 which fills the grooves or recesses 22 and the large recess 23.

Figure 5:
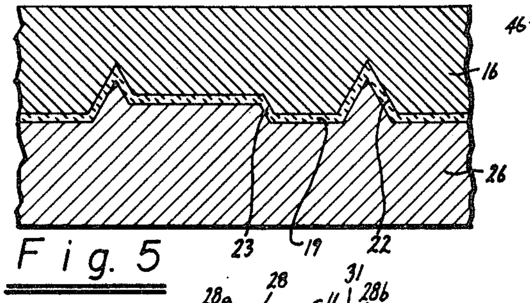
Figure 6:
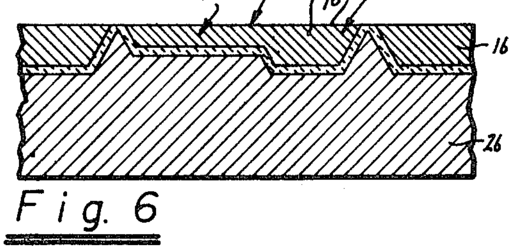

The structure shown in FIG. 5 is then placed in a lapping machine to remove the undesired portions of the semi-conductor body 16. The semiconductor body 16 is lapped and polished until the silicon dioxide layer formed in the recesses 22 is exposed through the top side to provide islands 28 of semiconductor material which are carried by the support body 26 and which are insulated from each other and from the support body by the dielectric insulating layer 19 formed of silicon dioxide. It can be seen that the one island 28 which is shown in FIG. 6 is provided with a relatively elongate portion **28*a* which has a thickness which is substantially less than the remaining portion 28*b* of the island 28, which will be utilized for the fabrication of the pinched resistor hereinafter described. The island 28 is provided with a planar surface 31 which lies in the same plane as the other surfaces of the other islands. An insulating or masking layer 32 is formed on the surface 31 in a suitable manner by placing the structure shown in FIG. 6 in an oxidizing atmosphere to provide a silicon dioxide layer 32. Thereafter, a window 33 is formed in the oxide layer by suitable photolithographic techniques and an impurity of a conductivity opposite to that of the island is diffused through the window 33 to provide a region 34** of opposite conductivity and a dish-shaped PN junction which extends to the surface 31. The oxide layer 32 is then regrown over the window area 33 during the diffusion of the region 34 of opposite conductivity. First and second windows 37 are then provided in the oxide layer 32 with one of the windows being adjacent to the extreme end of the channel portion 28a and the other being at the extreme end of the thicker portion 28b. Thereafter an N+ impurity is diffused through the windows 37 to form contact regions 38 in the island 28.

Windows 41 are then formed in the oxide layer overlying the P-type region 34 and the N+ regions 38. Metallization in the form of aluminum is then deposited over the insulating layer 32 and into the windows 41 to make contact with the N+ and P regions. The undesired metal is then removed by photolithographic techniques so that there remains a first lead structure 46 which is in contact with the N+ region in the shallow portion *28a* of the island 28 and which continues over and is in contact with the P region 34. In addition, the lead structure 46 is of such size that it covers the entire P-type region and extends outwardly beyond the same to serve as a field plate to enlarge the depletion region as hereinafter described. The second lead structure 47 makes contact with the other N+ region overlying the thicker portion *38b* of the island 28.

Figures 7, 8, 9, 10:
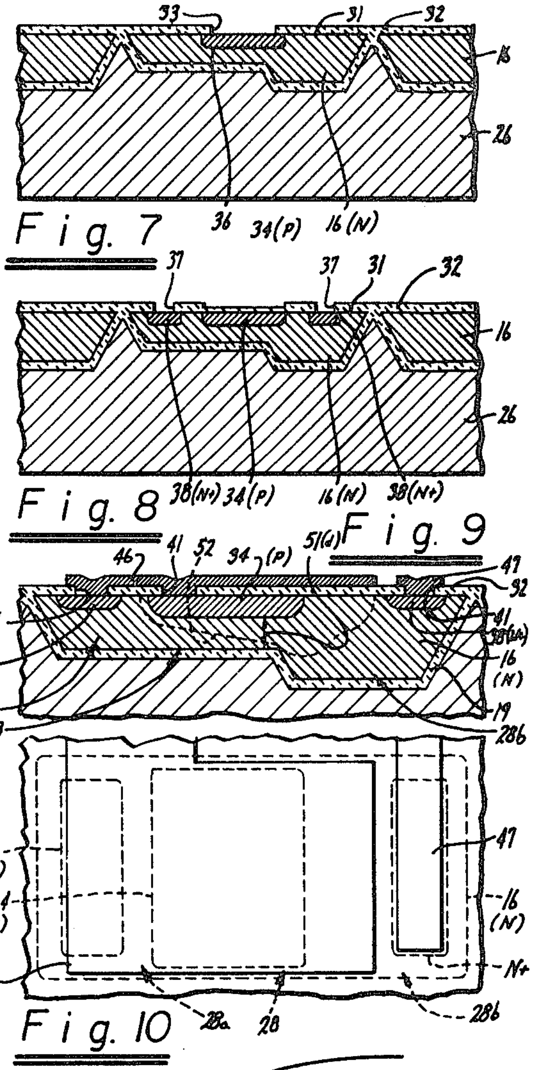
FIG. 10 is a plan view of the pinched resistor shown in FIG. 9.

By way of example, the pinched resistor shown in FIGS. 9 and 10 can have a width of approximately 100 microns and a length of 50–500 microns. A channel 51 is formed between the P-type diffused region 34 and the insulating layer 19 and has a depth which is determined by the pinch-off voltage desired. Typically for the geometry above given, this can range 9 to 14 microns.

The pinch-off voltage can be found from the following formula:

$$V_p = N.p.d^2/2.\epsilon_0.\epsilon = \text{e.g. } 15\text{–}30\ V$$

where $N$ = the resistance of the material, e.g. 25 to 35 Ohm-centimeters $q$ = electron charge $d$ = depth of the channel $\epsilon_0$ = permittivity of free space $\epsilon$ = relative dielectric constant (of silicon)

The pinch-off current is proportional to the pinch-off voltage and the channel resistance as set forth in the formula below:

$$I_p = V_p/3\ \mathbf{R}_{ch}$$

Where $R_{ch}$ is the channel resistance

Figure 11:
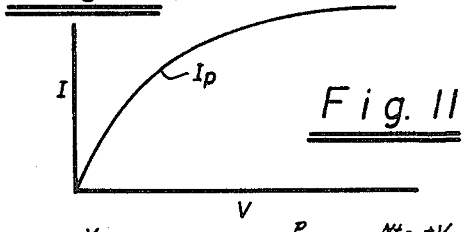
FIG. 11 is a graph showing the manner in which the pinch-off current $I_P$ remains constant after a predetermined voltage is reached.
Figure 12:
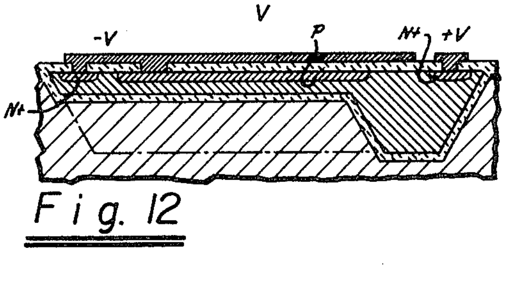
FIG. 12 is a cross-sectional view similar to FIG. 9 showing a pinched resistor which would have a relatively low value of pinch-off current.

In operating the pinched resistor which is shown in FIGS. 9 and 10, a voltage is applied to the two lead structures 46 and 47 which causes a depletion layer 52 to be formed in the channel region under the field plate. As the voltage increases, the depletion layer becomes wider and deeper and begins to pinch off the channel progressively as the voltage is increased. This continues until the voltage is sufficient to cause the depletion layer to penetrate the entire channel thickness to reach the insulating layer 19 as shown in FIG. 9. From this point on the current is constant regardless of the voltage applied to the terminals. The voltage current relationship is shown in the graph in FIG. 11 in which it can be seen that the current increases until a predetermined voltage is reached and thereafter the current is substantially constant. In the curve shown in FIG. 11 it can be seen that initially as the voltage is increased, the $I_p$ curve has a slope which is proportional to the resistance of the channel. However, as the depletion layer approaches the channel thickness, the current becomes more and more constant so that at a predetermined voltage the channel is completely pinched off and the current remains constant regardless of voltage. The pinch-off current $I_p$ is determined by the channel thickness and also by the channel length. By increasing the channel thickness and decreasing its length, the pinch-off voltage required to obtain a constant current is increased. Conversely by decreasing the channel thickness and increasing its length the pinch-off voltage can be reduced. A construction showing a pinched resistor of the latter type is shown in FIG. 12. With such an arrangement it can be seen that it is possible to provide a pinched resistor which has a very low pinch-off current.

It can be seen from the foregoing that by utilizing pinched resistors incorporating the present invention, it is possible to provide relatively high values of resistance which would be suitable for high voltages as for example 300 volts. The construction of the pinched resistor is such that it is compatible with the steps utilized in making dielectrically isolated integrated circuits. There is only one additional basic step which is required and that is the additional etching step to remove additional portions of the semiconductor body to provide the shallow portion *28a* of the island which is utilized for the pinched resistor. All the other steps can be carried out simultaneously with the formation of the integrated circuits. For example, the diffusion steps which are required for making the P type and N+ regions in other devices can be used for the pinched resistors.

I claim:

1. In a method for forming a pinched resistor structure in a semiconductor body of one semiconductive type, forming an isolation moat in one surface of the semiconductor body which extends to a predetermined depth in the semi-conductor body, said isolation moat defining an area in the semiconductor body, forming a recess in the semiconductor body within said area adjacent one side of said area, said recess having a depth which is substantially less than the depth of the moat, forming a layer of insulating material in the moat and in the recess, forming a support structure upon the layer of insulating material, removing a portion of the semiconductor body until the layer of insulating material in the moat is exposed to provide an isolated island in which one portion has a lesser depth than the other portion, forming a region of a conductivity type opposite that of the island within the island and having at least a portion of the region being disposed within said portion of lesser depth, forming contact means making contact with the portion of lesser depth and the remaining portion, forming a metal field plate which overlies said region of opposite conductivity and extending beyond said region of opposite conductivity and connecting the same to the contact means making contact with said portion of lesser depth.

2. A method as in claim 1 wherein said region of opposite conductivity is disposed in said portion of lesser depth to define a relatively shallow channel disposed between said first and second contact means.

3. A method as in claim 1 together with the step of applying a voltage to the contact means to create a depletion layer which extends through the channel to pinch off further current flow so that there is a substantially constant current flow regardless of the voltage applied to the contact means.

* * * * *